United States Patent [19]
Willis

[11] 4,094,444
[45] June 13, 1978

[54] SEED METERING DEVICE HAVING HIGH FRICTION MATERIAL ON ROTATING WHEEL

[75] Inventor: Robert Anthony Willis, Hythe, England

[73] Assignee: Stanhay (Ashford) Limited, England

[21] Appl. No.: 779,416

[22] Filed: Mar. 18, 1977

[51] Int. Cl.² ........................... A01C 7/04; A01C 7/20
[52] U.S. Cl. .................................. 221/266; 221/277; 222/345
[58] Field of Search ............... 221/260, 266, 277; 222/238, 342, 345, 406

[56] References Cited

FOREIGN PATENT DOCUMENTS

| 1,138,269 | 10/1962 | Germany | 222/342 |
| 411,439 | 11/1966 | Switzerland | 221/266 |
| 961,593 | 6/1964 | United Kingdom | 221/266 |
| 1,267,873 | 3/1972 | United Kingdom | 221/266 |

Primary Examiner—Allen N. Knowles
Assistant Examiner—David A. Scherbel
Attorney, Agent, or Firm—Pollock, VandeSande and Priddy

[57] ABSTRACT

A seed metering device comprising a seed hopper having a base which is in part sealed by two sets of contra-rotated circular rotary members driven about adjacent substantially horizontal axes, one set of the rotary members having the form of Vee-belt pulleys each of which is provided with a plurality of regularly spaced single seed receptors at the base of its Vee-shaped peripheral slot, the other set of said rotary members having complementray Vee-shaped protruding rims of high friction material penetrating upper parts of the said slots with close tolerance to sweep open faces of the seed receptors, and at least one masking plate mounted in the seed hopper and having an arcuate edge closely spaced from the said open faces of the seed receptors, the masking plate being located beneath the location at which the Vee-shaped protruding rims sweep the said open faces of the seed receptors to maintain single seeds within the receptors until the seeds reach a position at which the seeds can be released from said receptors.

8 Claims, 3 Drawing Figures

SEED METERING DEVICE HAVING HIGH FRICTION MATERIAL ON ROTATING WHEEL

BACKGROUND OF THE INVENTION

This invention concerns a seed metering device for the singling and accurate spacing of seeds fed from the hopper of a seed drill. The device is especially, but not essentially, adapted for dealing with elongated or lozenge-shaped seeds, such as wheat, oats and barley.

SUMMARY OF THE INVENTION

The object of the invention is to provide a seed metering device which is capable of accurate and rapid operation so as to enable a seed drill to which it is attached to be towed at high speed over ground to be sown.

This object is achieved, according to the invention, by providing a seed metering device comprising a seed hopper, having a base which is in part sealed by two sets of contra-rotated circular rotary members driven about adjacent substantially horizontal axes, one set of the said rotary members having the form of Vee-belt pulleys each provided with a plurality of regularly spaced single seed receptors at the base of its Vee-shaped peripheral slot, the other set of rotary members having complementary Vee-shaped protruding rims of high friction material penetrating upper parts of the said slots with close tolerance to sweep open faces of the seed receptors and at least one masking plate mounted in the seed hopper and having an arcuate edge closely spaced from the said open faces of the seed receptors, said masking plate being located beneath the location at which the Vee-shaped protruding rims sweep said open faces of the seed receptors to maintain single seeds within the receptors until the seeds reach a position at which said seeds can be released from the seed receptors.

A further object of the invention is to provide a metering device for cereal seeds in which case the seed receptors are formed as elongated recesses and are slightly longer and broader than the average dimensions of the seeds being sown.

To ensure positive ejection of the seeds at the position at which the seeds are released, according to another object of the invention a continuous groove narrower than the seed receptor width is preferably provided in the middle of each Vee-shaped slot and a thin stationary blade penetrates the groove to force seeds radially outwards as their receptors are driven past its leading edge.

The Vee-shaped protruding rims which sweep the open faces of the seed receptors are preferably made from hard rubber, bonded to the peripheries of the second set of rotary members and ground to ensure the close tolerance above referred to.

A comb-like plate whose teeth likewise enter the Vee-shaped slots with close tolerance seals the hopper-base against escape of seeds past the adjacent peripheries of the first set of rotary members.

A similar plate co-operates with the second set of rotary members to prevent them from carrying seeds out of the hopper.

The first set of rotary members, which may be termed spacing wheels, are preferably of considerably greater diameter than the second set, which may be termed singling wheels, and the latter are preferably driven at higher rotational speed.

Drive to the two sets of wheels may be derived from a ground-wheel and is in any case related to the speed of the seed drill over the ground to ensure a desired spacing between released seeds.

The spacing wheels are preferably easily removable and replaceable by similar wheels having seed receptors of dimensions suited to seeds of differing shape and size.

In operation cereal seeds drop into the seed receptors in the momentarily upper portions of the spacing wheels, being necessarily guided into alignment with those receptors by the Vee form of the peripheral slots co-operating with their own elongated shape.

The sweeping action of the singling wheels flicks away surplus seeds from the receptors, and the masking plates retain the singled seeds in their receptors as they rotate down to the release point where they fall by gravity or are positively ejected by the narrow blades to fall to the ground in accurately spaced rows.

BRIEF DESCRIPTION OF THE DRAWINGS

The above and other objects of the invention are embodied in the following description of a prototype seed metering device which is illustrated in the accompanying drawings in which.

DESCRIPTION OF PREFERRED EMBODIMENT

Figure 1:
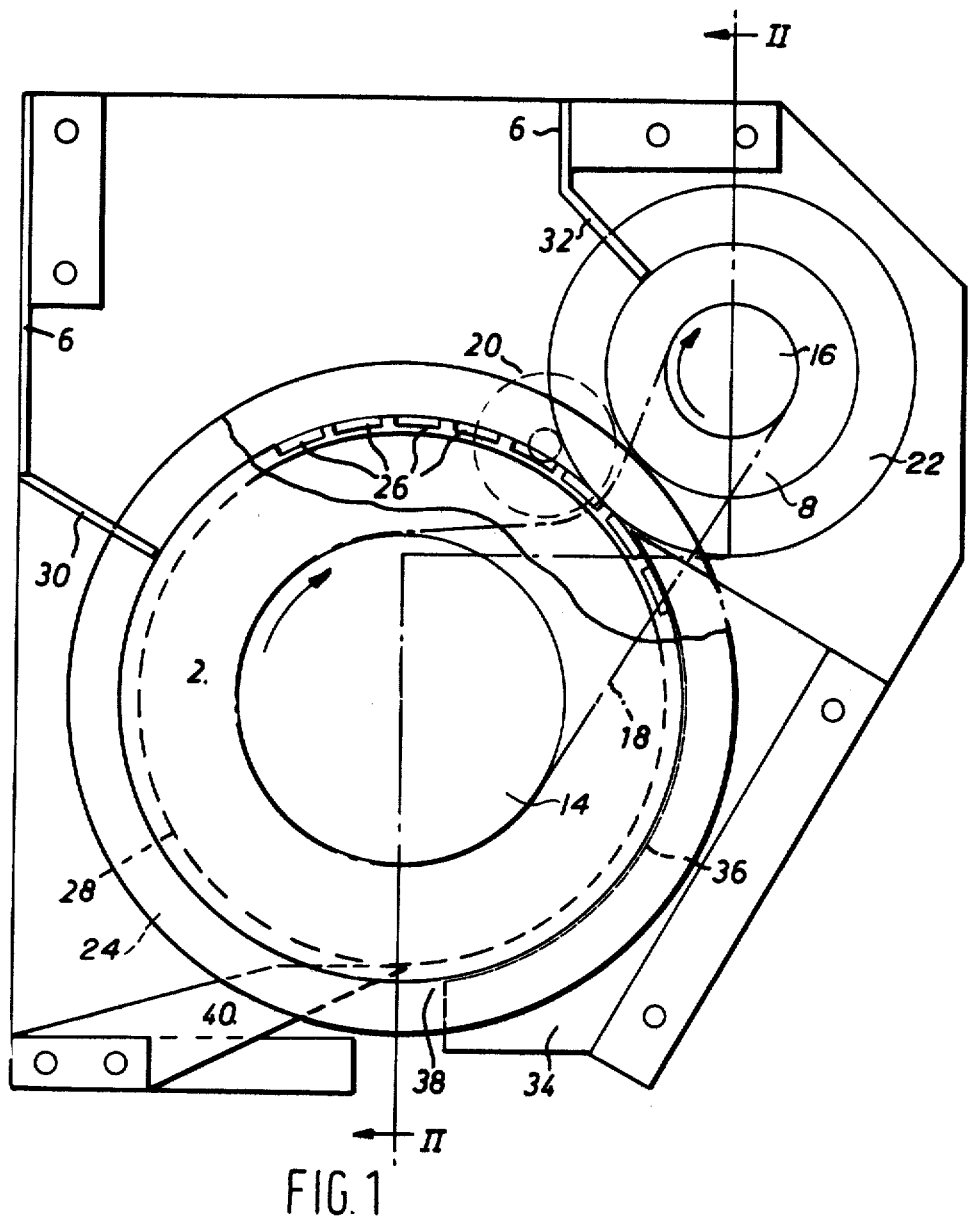
FIG. 1 is a diagrammatic side elevation of the device.
Figure 2:
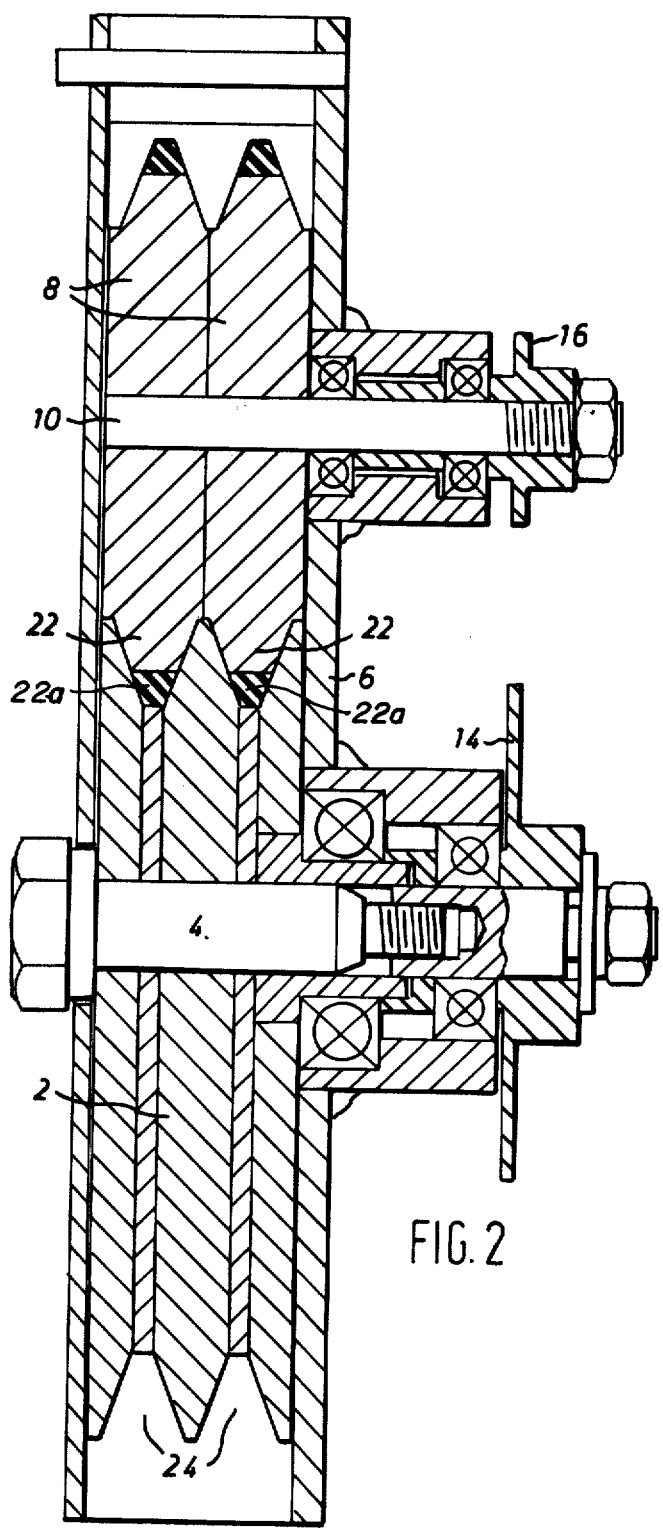
FIG. 2 is a section on the line II—II of FIG. 1.

The illustrated prototype device has two spacing wheels and two singling wheels, but a full scale production version will have many such devices arranged in staggered rows in a wheeled chassis.

In the drawings a pair of spacing wheels 2 are shown mounted for rotation on a shaft 4 journalled in a casing 6.

A pair of singling wheels 8 are mounted on a shaft 10 similarly journalled in the casing 6 and extending parallel to the shaft 4.

The singling wheels 8 are driven via spindle 10, and drive is transmitted to the spacing wheels 2 through sprockets 14 and 16 and a chain 18 tensioned by a jockey 20.

The singling wheels 8 are about half the diameter of the spacing wheels 2 and are driven at three times the speed. They have Vee-shaped protruding rims 22 tipped by hard rubber material 22a bonded thereto.

The spacing wheels 2 are similar to Vee-belt pulleys, and the rims 22 enter the Vee-shaped peripheral slots 24 in the wheels 2 with close tolerance.

Figure 3:
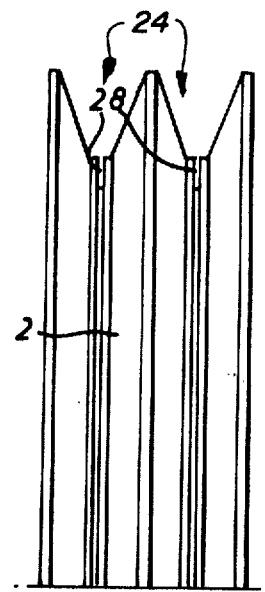
FIG. 3 is a detailed section of half a spacing wheel.

The slots 24 are formed with regularly spaced elongated recesses 26, which constitute single seed receptors, and deeper central narrow grooves 28 as shown in FIG. 3.

The recesses 26 are dimensioned to suit particular varieties of seeds, and in the prototype are 14 mm. long and 3.5 mm. deep for dealing with oats.

The casing 6 constitutes the lower outlet portion of a seed hopper of similar width to the casing and a seal is made with the spacing wheels 2 by a comb-like plate 30, whose teeth have a similar profile to the rims 22 of the singling wheels 8. A similar plate 32 seals the casing 6 with the singling wheels 8.

A stationary masking plate 34, whose arcuate edge 36 is closely spaced from the base of the slot 24 of each spacing wheel, retains a seed within each recess 26 until it reaches the release point 38.

A narrow profiled blade 40 penetrates each groove 28 with its leading edge radially inward of the bases of the recesses 26 and positively ejects any seed which has not fallen under its own weight at the release point 38.

In operation, seeds are presented to the recesses 26 in the spacing wheels 2 as they are driven past the base of the casing 6. A single seed, oriented by the Vee shape of the peripheral slot 24 of the spacing wheel 2, falls into each recess 26 and any surplus seed is flicked away by the contra-rotating rubber tips 22a of the rim 22 of the co-operating singling wheel 8.

The seed is now retained in its receptor by the arcuate edge of the complementary masking plate 34 until it reaches the release point 38, where it can fall to the ground.

Should the seed be held by friction in its receptor, it is positively ejected by the narrow blade 40 and is then directed (like a gravity-released seed) to prepared ground.

It will be understood that the invention is not restricted to the details of the preferred form described by way of example which may be modified without departure from the scope of the appended claims.

I claim:

1. A seed metering device comprising a seed hopper having a base defining an aperture; two sets of contra-rotated circular rotary members driven about adjacent substantially horizontal axes and sealing said aperture in said base, one set of the said rotary members having the form of Vee-belt pulleys each provided with a plurality of regularly spaced single seed receptors at the base of its Vee-shaped peripheral slot and the other set of said rotary members having Vee-shaped protruding rims of high friction material penetrating upper parts of the said slots with close tolerance to sweep open faces of said seed receptors; and at least one masking plate mounted in said seed hopper and having an arcuate edge closely spaced from the said open faces of said seed receptors, said masking plate being located beneath the location at which the Vee-shaped protruding rims sweep said open faces of said seed receptors to maintain single seeds within the receptors until the seeds reach a position at which said seeds can be released from said receptor.

2. A seed metering device as claimed in claim 1, in which the seed receptors are formed as elongated recesses slightly longer and broader than the average dimensions of the seeds being sown.

3. A seed metering device as claimed in claim 1, in which a continuous groove, narrower than said seed receptors, is provided in the center of each Vee-shaped slot around the periphery of the base thereof and a thin stationary blade, penetrating the groove, is provided at the said position at which said seeds are released to force said seeds radially outwards from the receptors.

4. A seed metering device as claimed in claim 1, in which the said Vee-shaped protruding rims are made from hard rubber bonded to the peripheries of the said other set of rotary members.

5. A seed metering device as claimed in claim 1, in which a comb-like plate is mounted in said seed hopper, the teeth of said comb-like plate being arranged to enter the Vee-shaped slots of said one set of rotary members with close tolerance to seal the base of said hopper against escape of seeds past the adjacent peripheries of said one set of rotary members.

6. A seed metering device as claimed in claim 5, in which a further comb-like plate is mounted in said seed hopper, the teeth of said further comb-like plate being arranged to co-operate with said other set of rotary members to prevent said members from carrying seeds out of the seed hopper.

7. A seed metering device as claimed in claim 1, in which the said one of rotary members are of greater diameter than the said other set and are driven at slower speed.

8. A seed metering device as claimed in claim 1, in which the drive to the rotary members is derived from a ground wheel.